US006770338B1

(12) United States Patent
Lind

(10) Patent No.: US 6,770,338 B1
(45) Date of Patent: *Aug. 3, 2004

(54) POLYMERIC FILM STRUCTURES USEFUL AS SHRINK BAGS

(75) Inventor: Keith D. Lind, Appleton, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/591,244

(22) Filed: Jun. 9, 2000

Related U.S. Application Data

(63) Continuation-in-part of application No. 09/329,415, filed on Jun. 10, 1999.

(51) Int. Cl.[7] .......................... B32B 27/08; B65B 53/00
(52) U.S. Cl. .................... 428/34.9; 428/34.1; 428/515; 428/516; 428/520; 428/910
(58) Field of Search .............................. 428/34.1, 34.9, 428/515, 516, 520, 910, 36.4, 325, 329, 331, 35.2, 35.4, 212

(56) References Cited

U.S. PATENT DOCUMENTS

| | | | |
|---|---|---|---|
| 4,698,261 A | | 10/1987 | Bothe et al. ................ 428/204 |
| 4,714,638 A | | 12/1987 | Lustig et al. ............... 428/34.9 |
| 4,853,265 A | | 8/1989 | Warren ....................... 428/34.9 |
| 4,853,287 A | | 8/1989 | Schirmer .................... 428/86.7 |
| 4,855,183 A | * | 8/1989 | Oberle ........................ 428/345 |
| 4,894,107 A | | 1/1990 | Tse et al. .................... 156/229 |
| 4,965,136 A | | 10/1990 | Mueller ....................... 428/414 |
| 5,023,143 A | | 6/1991 | Nelson ........................ 428/516 |
| 5,030,511 A | | 7/1991 | Moffitt ........................ 428/336 |
| 5,089,308 A | | 2/1992 | Nordness et al. |
| 5,147,594 A | | 9/1992 | Moffitt ........................ 264/514 |
| 5,147,696 A | * | 9/1992 | Lansbury et al. .......... 428/36.4 |
| 5,164,268 A | | 11/1992 | Dollinger et al. ......... 428/476.3 |
| 5,283,128 A | * | 2/1994 | Wilhoit ....................... 428/516 |
| 5,538,770 A | | 7/1996 | Bekele ....................... 428/36.7 |
| 5,635,261 A | * | 6/1997 | Georgelos et al. ......... 428/35.4 |
| RE35,567 E | | 7/1997 | Newsome ................... 428/35.1 |
| 6,010,792 A | * | 1/2000 | Lind et al. .................. 428/516 |
| 6,074,715 A | * | 6/2000 | Lind et al. .................. 428/35.4 |

FOREIGN PATENT DOCUMENTS

| | | |
|---|---|---|
| EP | 0 003 635 A | 8/1979 |
| WO | WO 00 00392 A | 1/2000 |

* cited by examiner

*Primary Examiner*—Harold Pyon
*Assistant Examiner*—Sow-Fun Hon
(74) *Attorney, Agent, or Firm*—McDermott, Will & Emery

(57) ABSTRACT

The invention relates to heat shrinkage films having polyvinylidene chloride methyl acrylate blend as a barrier layer. Specifically, this invention relates to film structures having a first barrier layer comprising polyvinylidene chloride methyl acrylate blend wherein said barrier layer has two opposing surfaces; a second layer adhered to one of the surfaces of the first barrier layer comprising ethylene vinyl acetate copolymer blend; a third layer adhered to the other surface of the first barrier layer comprising an ethylene vinyl acetate copolymer blend; a fourth layer adhered to one of said second or said third layer comprising an ethylene acetate copolymer blend wherein the melt indexes of said blends of said second, third and fourth layers are the same; a fifth layer adhered to the other of said second or third layer comprising a blend of linear low density polyethylene and low density polyethylene. Said film structures have usefulness as shrink bags. Said film structure is oriented and may optionally be irradiated.

16 Claims, 2 Drawing Sheets

POLYMERIC FILM STRUCTURES USEFUL AS SHRINK BAGS

This application is a Continuation-in-part of U.S. patent application Ser. No. 09/329,415 filed Jun. 10, 1999 entitled Polymeric Film Structures Useful as Shrink Bags.

BACKGROUND OF THE INVENTION

Heat shrinkable polymer films have gained substantial acceptance for use in meat packaging. This description will detail the usage of films for packaging meat, it being understood that these films are also suitable for packaging other products. The films embodying this invention are useful as heat shrinkable bags supplied to the meat packer with one open end, to be closed and sealed after insertion of the meat. After the product is inserted, air is normally evacuated, the open end of the bag is closed, such as by heat sealing, or applying a metal clip, and finally heat is applied, such as by hot water, to initiate film shrinkage about the meat.

In subsequent processing of the meat, the bag may be opened and the meat removed for further cutting of the meat into user cuts, for retail sale, for example, or for institutional use.

Successful shrink bags must satisfy a multiplicity of requirements imposed by both the bag producer and the bag user. Of primary importance to the bag user is the capability of the bag to survive physically intact the process of being filled, evacuated, sealed closed, and heat shrunk. The bag must also be strong enough to survive the meat handling involved in moving the contained meat, which may weigh 50 pounds or more, along the distribution system to the next processor, or to the user. Thus, the bag must physically protect the meat.

It is also highly desirable to the bag user that the bag serve as a barrier to infusion of gaseous materials from the surrounding environment. Of particular importance is provision of an effective barrier to infusion of oxygen, since oxygen is well known to cause spoilage of meat.

The bag producer requires a product which can be produced competitively while meeting the performance requirements of the user. Thus the bag material should be readily extrudable, and susceptible to orientation, with sufficient leeway in process parameters as to allow for efficient film production. The process should also be susceptible to efficient extended production operations. In the orientation process, the film must be tough enough to withstand the stretching. The orientation temperature should be a temperature which is economically achieved by the producer, and which provides for use of economical shrink processes by the bag user.

Conventional shrink bags have generally been constructed with ethylene vinyl acetate copolymers (EVA). In some cases the bags contain a layer of a Saran copolymer to serve as an oxygen barrier. Ethylene vinyl alcohol copolymer (EVOH) has also been suggested as the barrier layer.

Notwithstanding the advantages, shrink-bag packaging of meat is not without its difficulties, many of which are attributable to limitations in the film. As will be appreciated, the processes of stretching the film, and later shrinking it, expose the film to rather severe conditions, due to the nature of the operations.

It is especially important to appreciate that the film is particularly vulnerable to failure at conditions of operation, due to the relatively high temperatures to which it is exposed in the orientation and shrinking process.

The film must be susceptible to orientation without distortion, or separation of the multiple layers which are normally present in films of this nature. The film must be strong enough, at the orientation temperature to withstand the stretching without creation of holes, tears, or non-uniform zones of stretching.

In the case of blown tubular film, the film must be capable of supporting the stretching bubble during the orientation process. Finally, each of the layers of the film should be susceptible to orientation without fracture, separation, or creation of holes in the layer.

In packaging use, the film must respond to heat rapidly enough for commercial practicability, and yet must not exhibit such a level of shrink energy as would cause the film to pull apart or delaminate during shrinkage, under its own internal forces.

In U.S. Pat. No. 4,457,960 oriented multiple layer polymeric films comprise a barrier layer having two opposing surfaces; a second layer adheres to one surface of the first layer, said second layer being 10% to 90% linear low density polyethylene and 90% to 10% ethylene vinyl acetate copolymer; and a third layer adheres to the other surface of the first layer, the composition of said third layer being an ethylene vinyl acetate or a blend of 10% to 90% linear low density polyethylene with 90% to 10% of ethylene vinyl acetate. The '960 patent further discloses a five layer film structure having a barrier layer; a second and third layer having essentially the same composition and a fourth and fifth layer having essentially the same composition with at least one of said pairs having at least 50% of an ethylene vinyl acetate copolymer, the remainder being linear low density polyethylene and at least one of the pairs comprises at least 10% linear low density polyethylene, the remainder being ethylene vinyl acetate copolymer.

In U.S. Pat. No. 4,853,265 the heat-shrinkable, oriented, multi-layer packaging film has at least two layers comprising an ethylene vinyl acetate copolymer. One of the ethylene vinyl acetate copolymer layers has a melt index difference of about 0.3 dg/minute from the melt index of the other ethylene vinyl acetate copolymer layer.

In U.S. Pat. No. 4,894,107 a process for making multiple layer polymeric films is disclosed. The films have a layer of vinylidene chloride copolymer between at least two other layers which contain ethylene vinyl acetate and optionally, linear low density polyethylene.

In U.S. Pat. No. 5,030,511 films are made from vinylidene chloride copolymer compositions comprising about 0.01% to 6% by weight of a processing aid wherein said processing aid has a molecular weight of less than about 700. The films also have a first and second layer wherein each of the first and second layers comprises an ethylene vinyl acetate copolymer having a melt index greater than about 1.2.

In U.S. Pat. No. '5,538,770 the polymeric film comprises first and second surface layers wherein said first and second surface comprise an olefinic polymer or copolymer and a vinylidene chloride polymeric layer disposed between said first and second layers wherein said vinylidene chloride polymeric layer comprises 100 parts by weight of at least one vinylidene chloride copolymer; between 4 and 15 parts by weight of a plasticizer and between 4 and 15 parts by weight of an acrylate/styrene copolymer.

Despite the known technology surrounding heat-shrinkable films, there is still a need to improve the film in order to meet the demands of the meat packaging industry.

Thus, it is an object of the invention to provide improved film structures for use in shrink bags wherein the shrink bags are capable of withstanding production and shrink processes.

SUMMARY OF THE INVENTION

The present invention provides an oriented multiple layer polymeric film useful in the packaging of meat. The present invention also provides for a process for manufacturing the oriented multiple layer polymeric film of the present invention. The present invention still further provides for heat shrinkable bags which are made of the oriented multiple layer polymeric film of the invention and are useful in the packaging of meat.

In one embodiment of the present invention the oriented multiple layer polymeric film has a first barrier layer, the first layer having two opposing surfaces; a second layer is adhered to one of the surfaces of the first layer; a third layer is adhered to the other surface of the first layer, a fourth layer is adhered to one of said second or said third layer; and a fifth layer is adhered to the other of said second or third layer.

In this embodiment the barrier layer comprises a polyvinylidene chloride methyl acrylate blend, the second and third layers independently comprise a blend of two ethylene vinyl copolymers wherein the melt index of the blend for each of the second and third layers are the same; the fourth layer comprises a blend of two ethylene vinyl copolymers and processing additives wherein the melt index for the EVA blend of said fourth layer is the same as the melt index for said second and third layers; and the fifth layer comprises a blend of linear low density polyethylene (LLDPE) and low density polyethylene (LDPE).

A preferred embodiment of the present invention also has a first barrier layer with two opposing surfaces, said first barrier layer comprising a polyvinylidene chloride methyl acrylate blend. A second and third layer adheres to the surfaces of said barrier layer comprising a blend of two different ethylene vinyl acetate copolymers (EVA) wherein the melt index for the EVA blend of each second and third layer are the same; wherein for each second and third layer one of the EVA is present in a range of about 65%–85%, preferably about 74%, based on the total weight of the layer; the other EVA is present in a range of about 15%–35%, preferably about 26%, based on the total weight of the layer. A fourth layer adheres to one of said second or third layer comprising a blend of two different EVAs and processing additives wherein the melt index for the EVA blend of said fourth layer is the same as the melt index for said second and third layers, and wherein one of the EVAs of the blend of EVAs is present at about 65%–85%, preferably about 72.5%, and the other EVA is present at about 15–35%, preferably about 25% based on the total weight of the layer, and the processing additives are present at about 0.1%–0% and preferably about 2.5%, based on the weight of the layer. A fifth layer adheres to the other of said second or third layer comprising a blend of LLDPE and LDPE wherein the LLDPE is present at about 80–100%, and preferably about 90%, and the LDPE is present at about 0–20%, and preferably about 10%, based on the total weight of the layer.

A still further embodiment of the present invention has a first barrier layer with two opposing surfaces comprising polyvinylidene chloride methyl acrylate blend. A second and third layer adheres to the surfaces of said barrier layer each second or third layer comprising a blend of two different EVAs wherein the melt index for the EVA blend of each second and third layers are the same with the understanding that one of said second or third layer may contain additional processing additives. A fourth layer adheres to the surface of said second or said third layer containing a blend of two different EVAs and processing additives wherein the melt index for the EVA blend of said fourth layer is the same as the melt index for said second and third layer. A fifth layer adheres to the layer of said second or said third layer containing only a blend of two EVA and wherein said fifth layer comprises a blend of LLDPE and LDPE.

A still further preferred embodiment of the present invention has a first barrier layer with two opposing surfaces comprising polyvinylidene chloride methyl acrylate blend; a second and third layer adhere to the surfaces of said barrier layer wherein one of said second or third layer comprises a blend of EVAs wherein one EVA is present at about 65–85%, preferably about 74%, and the other EVA is present at about 15–35%, preferably about 26%; the other of said second or third layer comprises a blend of two different EVAs, and processing additives and wherein one of the EVAs of the blend of EVAs is present at about 65%–85%, preferably about 72.5%, and the other EVA is present at about 15–35%, preferably about 25% based on the total weight of the layer, and the processing additives are present at about 0.1–10% and preferably about 2.5%, based on the weight of the layer; a fourth layer adheres to the surface of said second or third layer containing a blend of two different EVAs and processing additives wherein said layer comprises a blend of two different EVAs and processing additives wherein one EVA of the EVA blend is present at about 65–85%, preferably about 72.5%, and the other EVA is present at about 15–35%, preferably about 25%, and the processing additives are present at about 0.5–10%, preferably about 2.5%; a fifth layer adheres to the layer of said second or said third layer comprising a blend of two different EVAs wherein said fifth layer comprises a blend of LLDPE and LDPE wherein the LLDPE is present at about 80–100%, preferably about 90% and the LDPE is present at about 0–20%, preferably about 10% based on the total weight of the layer.

A still further preferred embodiment of the present invention has a first barrier layer with two opposing surfaces, said first barrier layer comprising a polyvinylidene chloride methyl acrylate blend. A second and third layer adheres to the surfaces of said barrier layer comprising a blend of two different ethylene vinyl acetate copolymers (EVA) wherein the melt index for the EVA blend of each second and third layer are the same; wherein for each second and third layer one of the EVA is present at about 65%–85%, preferably about 74% based on the total weight of the layer; the other EVA is present in a range of about 15%–35%, preferably about 26%, based on the total weight of the layer. A fourth layer adheres to one of said second or third layer comprising a blend of two different EVAs and processing additives wherein said additive comprises a slip agent and an antiblock agent and wherein said antiblock agent may be a blend of two or more antiblock agents and wherein said processing additives are present at about 0.1%–10%, preferably about 3%, based on the weight of the layer; a fifth layer adheres to the other of said second or third layer comprising a blend of LLDPE wherein the LLDPE is present at about 80%–100%, preferably about 90%, and LDPE is present at about 0%–20%, preferably about 10%, based on the total weight of the layer.

In all the multiple layer films of this invention, the barrier layer is preferably polyvinylidene chloride methyl acrylate blend. Other barrier resins such as polyvinyl chloride, ethylene vinyl alcohol copolymer would also be suitable in the practice of this invention.

The films of this invention may optionally be subject to irradiation after the completed fabrication of the multiple layer film structure but before or after orientation of said film structure.

Irradiation doses of from 2 MR to about 10 MR are used to irradiate the films of the present invention. A more preferred irradiation dose for the films of the invention is from about 4 MR to 6 MR.

A substantial end use of the invention is in heat sealable shrink bags for utilization particularly in packaging of meat. Bags made according to the invention find particular utility in forming packages which are subjected to low temperature shrinking processes.

DETAILED DESCRIPTION OF THE INVENTION

It has been discovered that heat shrinkage bags comprised of the 5-layer film structures of the present invention possess improvements over known shrink bag. These improvements are increased shrink at lower temperature and improved coefficient of friction which results in an improved end use due to the use of less starch.

Figure 1:
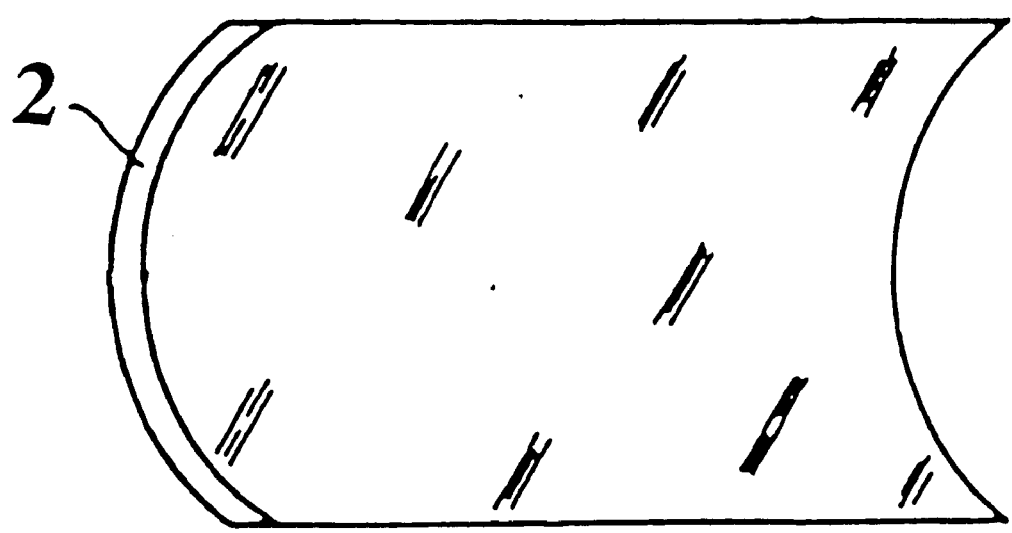
FIG. 1 is a bag made according to the invention

FIG. 1 shows a bag made according to the invention. The empty bag shown is a collapsed, molecularly oriented tube with one end closed by a heat seal 2 across the one end of the tube. The other end of the bag is open for the insertion of meat, and it is normally closed and sealed when the meat is put into the bag.

Figure 2:
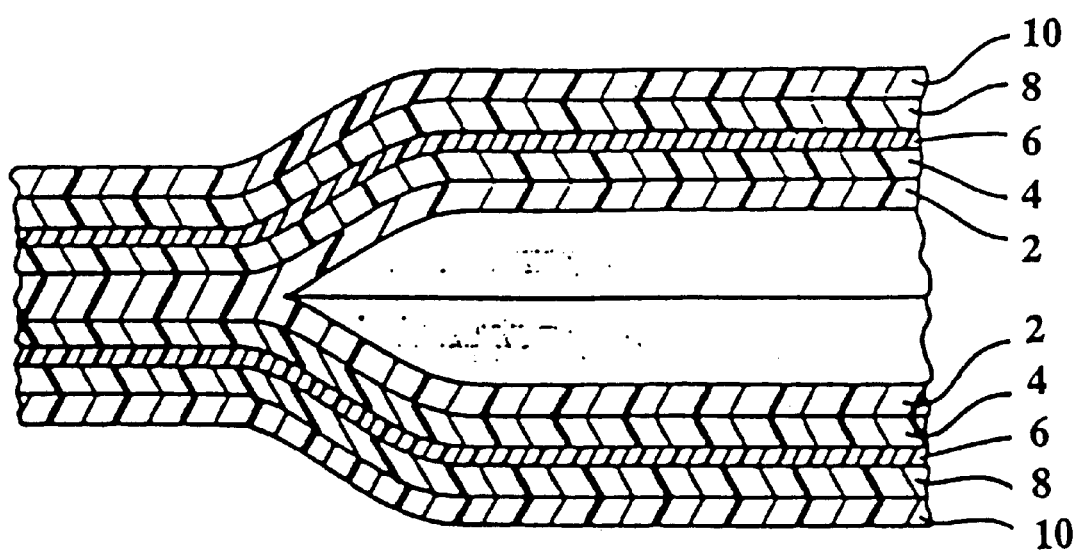
FIG. 2 is a cross-section of the bag of FIG. 1 showing a 5-layer bag structure.

FIG. 2 shows a structure wherein the bag is made from a 5-layer film structure of the present invention. Layer 6 is the barrier layer which minimizes the transmission of oxygen through the film. Layer 4 is the inner tie layer which serves to improve adhesion. Layer 8 is the outer tie layer which serves to also improve adhesion. Layer 10 is the outer layer which serves to protect the bag and its product from abuse. Layer 2 is the heat sealant layer. It is to be noted that the components of layer 4 and layer 8 contribute to the higher shrink at lower temperature improvement of the present film structure. In a preferred embodiment of the present invention layer 6 is 100% of polyvinylidene chloride methyl acrylate blend; layer 4 is a blend of 74% of ethylene vinyl acetate copolymer having an vinyl acetate content of 18% and a typical melt index of 0.7 g/10 min and 26% of an ethylene vinyl acetate copolymer having a vinyl acetate content of 18% and a typical melt index of 2.1 g/10 min. Layer 8 is identical to layer 4. Layer 10 is a blend of 72.5% of a ethylene vinyl acetate copolymer having a vinyl acetate content of 18% and a typical melt index of 0.7 g/10 min and 25% of an ethylene vinyl acetate copolymer having a vinyl acetate content of 18% and a typical melt index of 2.1 g/10 min; layer 10 further comprises 1.5% of a slip processing aid and 1.0% of an antiblock. Layer 2 is a blend of 90% linear low density polyethylene and 10% low density polyethylene.

In another preferred embodiment of the present invention the barrier layer is 100% polyvinylidene chloride methyl acrylate blend. The outer tie layer is a blend of 72.5% of an ethylene vinyl acetate copolymer having a vinyl acetate content of 18% and a typical melt index of 0.7 g/10 min; 26% of a ethylene vinyl acetate copolymer having a vinyl acetate content of 18% and a typical melt index of 2.1 g/10 min, 1.5% of a slip processing aid and 1.0% of an antiblock. The inner tie layer is a blend of 74% of an ethylene vinyl acetate copolymer having a vinyl acetate content of 18% and a typical melt index of 0.7 g/10 min and a ethylene vinyl acetate copolymer having a vinyl acetate content of 18% and a typical melt index of 2.1 g/10 min. The outer layer is identical to the outer tie layer. The sealant layer is a blend of 90% linear low density polyethylene and 10% low density polyethylene.

The overall thickness of films of this invention is nominally the same as the thickness of conventional films. Films are generally about 2.0 mils thick with a normal range of 1.5 to 3.0 mils. The individual layers of the film structure are in a range of 0.15 mils to 1.5 mils.

Ethylene vinyl acetate copolymers suitable for use in this invention are those having an 18% vinyl acetate content and a typical melt index of 0.7 g/10 min or a typical melt index of 2.1 g/10 min. Preferred ethylene vinyl acetate copolymers are manufactured by Exxon Chemical of Baytown, Tex.

These preferred ethylene vinyl acetate copolymers are exemplified by Exxon LD-730.09 and Exxon LD-725.36.

A polyvinylidene chloride methyl acrylate blend suitable for use in this invention is exemplified by Dow Chemical Co. MA, Saran X U 32019.09. This particular vinylidene chloride, methyl acrylate copolymer comprise 92.25 wt % of vinylidene chloride, 7.75 wt %, methyl acrylate; MW 90,000–92,000; and 2 to 3% of processing aids such as stabilizers, plasticizers, and lubricants.

These processing aids may be exemplified by epoxidized compounds, such as epoxidized linseed oil, epoxidized soybean oil, epichlorohydrin/bisphenol, epoxidized octyl tallate, epoxidized glycol dioleate, butyl ester of epoxidized linseed oil fatty acid, and the like. Other suitable processing aids may include an additive such as 2-ethyl hexyldiphenyl phosphate, tetrasodium pyrophosphate, oxidized polyethylene, antioxidant, magnesium oxide, or chlorinated polyethylene.

A linear low density polyethylene suitable for practice in this invention is exemplified by Dowlex 2247A-1 manufactured by Dow Plastics which is a business group of the Dow Chemical Company of Midland, Mich.

A low density polyethylene suitable for practice in this invention is Quantum NA 204-000 manufactured by the Millennium Petrochemicals of Cincinnati, Ohio.

A slip aid suitable for practice in this invention is exemplified by 1080823 U Slip manufactured by Spectrum Colors of Minneapolis, Minn.

An antiblock suitable for practice in this invention is exemplified by Spectratech CM 12124 manufactured by Equistar Chemical Corporation of Cincinnati, Ohio and by Ampacet 10579 manufactured by Ampacet Corporation of Mount Vernon, N.Y.

The barrier layer for the film structure of the present invention is preferably polyvinylidene chloride methyl acrylate blend. The barrier properties of this particular copolymer are well documented in the art. The ethylene vinyl acetate blends for the various layers of film structures of the present invention provide manufacturing processability. The addition of an antiblock aid to the outer layer of the film structure for a preferred embodiment further enhances the processability of the film structure. While the individual components of the film structure each contribute their individualistic properties, it is the particular combination of these various components that provide for the superiority of the film structures of the present invention.

Definitions

As used herein, the following terms are understood to have the meaning provided below:

"Polymer" means the product of polymerization and includes but is not limited to homopolymers, monopolymers, copolymers, interpolymers, terpolymers, block copolymers, graft copolymers, and addition copolymers.

"Processing aid" means a substance or material incorporated in a film or film layer to increase the flexibility, workability, or extrudability of the film. These substances include both monomeric plasticizers and polymeric plasticizers and are generally those materials which function by reducing the normal intermolecular forces in a resin thus permitting the macromolecules to slide over one another more freely. The art refers to many plasticizers as stabilizers. Thus, the terms "plasticizer" and "stabilizer" are intended to be used interchangeably herein.

"Oriented" or "Orientation" refer to the process of stretching a hot plastic article followed by rapidly cooling while in the stretched condition to realign a molecular configuration thus improving mechanical properties. Stretching in one direction is called uniaxial orientation and in two directions is called biaxial orientation. In thermoplastic flexible films which have been oriented there is an internal stress remaining in the plastic sheet which can be relieved by reheating the sheet to a temperature above that at which it was oriented. The material will then tend to shrink back to the original dimensions it had before it was stretch oriented. Thus "oriented" flexible films are "heat-shrinkable" flexible films, and the terms "oriented" and "heat-shrinkable" are used interchangeably herein. For clarity, it is noted that films made by a tubular process are referred to as having an orientation along the length of the tube, called the longitudinal direction and/or across the width of the tube, called the transverse direction.

An "oriented" or "heat shrinkable" material is defined herein as a material which, when heated to an appropriate temperature above room temperatures (for example 96° C.), will have a free shrink of about 5% or greater in at least one linear direction, as per ASTM D 2732.

"Melt index", abbreviated herein as MI, means melt flow measured at 190° C., 2.16 kilogram loading, as per ASTM D 1238, condition E.

As used herein the term "extrusion" or the term "extruding" is intended to include coextrusion, extrusion coating, or combinations thereof, whether by tubular methods, planar methods, or combinations thereof.

As used herein the term two different ethylene vinyl acetate copolymers refers to ethylene vinyl acetate copolymers having different melt indexes.

"Barrier" refers to a property in thermoplastic materials which indicates that the particular material has a very low permeability to gases, such as oxygen. The preferred barrier material referred to in the present invention is polyvinylidene chloride, methyl acrylate.

"Polyvinylidene chloride methyl acrylate blend" means that the blend comprises ≈97% vinylidene chloride methyl acrylate copolymer and 2% to 3% of processing aids.

The films described herein are capable of being manufactured according to conventional orientation processes. In the following example films are described in detail using equipment common to the "double bubble" process.

EXAMPLE 1

Example 1 is a film having a barrier layer of polyvinylidene chloride methyl acrylate blend which is Dow Chemical MA. Saran X U 32019.09; an outer tie layer and an inner tie layer each having a blend of 74% of Exxon 730.09 and 26% of Exxon 725.36; an outer layer having a blend of 72.5% of Exxon 730.09, 25% of Exxon 725.36, 1.5% of 108082 U Slip, and 1.07% of Ampacet 10579, and an inner sealant layer having a blend of 90% of Dowlex 2247A-1 and 10% of Quantum NA 204-000. The polyvinylidene chloride methyl acrylate blend; the ethylene vinyl acetate copolymer blends; and the blend of linear low density polyethylene and low density polyethylene were plasticated and melt extruded through five separate extruders into a five-layer die and formed into a five layer tubular film on conventional "double bubble" equipment. The resulting film was biaxially oriented, with a stretch factor of approximately 2.5 in each the machine direction and the 3.8 in the cross-machine direction. The oriented film was 0.25 ml thick and was composed of 2.25 ml of sealant layer; 1.05 ml of inner tie layer, 0.20 ml of outer tie layer, 0.55 l of outer layer and 0.20 ml of barrier layer. The film structure of Example 1 was irradiated at 4 to 4.6 MR.

The film of EXAMPLE 1 was tested for free shrink at 180° F. and 200° F. using the following procedure:

Apparatus: Constant temperature bath—temperature of 300 to 150° C. includes temperature control, thermometer, and circulation pump. Similar to Fisher No. 13-874-115.

Forceps—similar to Fisher No. 10-316A.

Metric graphic paper, graduated in mm, enclosed in plastic.

Timer or wall clock. Similar to Fisher No. 6-658 (timer or 6-664 (clock).

Wire gauze. Similar to Fisher No. 15-585B.

100 mm×100 mm template 0.5 mm.

Paper towels.

Razor blades—single edge safety.

Reagents: Tap water.

Safety: Caution: Avoid being burned by coming in contact with the shrink bath.

Avoid careless handling of razor blades.

Sampling: Using the 100 mm×100 mm template:

Place the template in the center of the web parallel to the edge of the bag.

Cut around the outside of the template.
   Retain the two samples, one each from the top and bottom position.
   By cutting the sample 100 mm×100 mm, percent shrink in both directions can be determined as a direct reading.

Mark the machine direction of each sample.

Procedure: Adjust the shrink bath temperature to 200° F.

Place the precut 100 mm×100 mm samples between two screens and immerse in the bath.

Immersion time: 60 seconds

This time (6.2.1) allows sufficient time to complete shrink the film.

Remove the sample from the bath and place on paper towel and pat dry.

Measure the flattened film in mm in both directions.

Do not stretch the sample.

Calculations: Read the percent shrink directly from the graph paper since the initial measurement was 100 mm in both directions.

Read the percent growth directly from the graph paper if the film shows growth rather than shrink.

Report: Report the percent shrink or growth in both machine and transverse directions.

Report the different in shrink or growth between the machine and transverse directions.

References: ASTM Standard Method D-2838.

ACC Standard Method M-721. Fischer=Fischer Scientific Co.

A control bag which was manufactured based on the disclosure of U.S. Pat. No. 4,457,960 gave the following results in the above described shrink test:

| Temperature | % Shrink in Machine Direction | % Shrink in Cross Machine Direction |
|---|---|---|
| 180% | 23.5% | 35% |
| 200% | 45% | 54% |

What we claim is:

1. An oriented multiple layer polymer films structure comprising:
   (a) a first barrier layer, said barrier layer having two opposing surfaces;
   (b) a second layer adhered to one of said surfaces of said barrier layer wherein the second layer comprises a blend of two ethylene vinyl acetate copolymers and wherein the two ethylene vinyl acetate copolymers which comprise the blend of the second layer each have a vinyl acetate content of at least 18% and different melt indexes;
   (c) a third layer adhered to the other surface of said barrier layer comprising a blend of two ethylene vinyl acetate copolymers and wherein the two ethylene vinyl acetate copolymers which comprise the blend of the third layer each have a vinyl acetate content of at least 18% and different melt indexes;
   (d) a fourth layer adhered to said second layer wherein the fourth layer comprises a blend of two ethylene vinyl copolymers and processing aids wherein said processing aids are selected from the group consisting of antiblock agents and slip agents and wherein the two ethylene vinyl acetate copolymers which comprise the blend of the fourth layer each have a vinyl acetate content of at least 18% and different melt indexes; and
   (e) a fifth layer adhered to said third layer wherein the fifth layer comprises a blend of linear low density polyethylene and low density polyethylene;
wherein said second, third and fourth layers have the same ethylene vinyl acetate (EVA) copolymer blend melt index in each layer.

2. An oriented multiple layer polymer film structure according to claim 1, wherein the processing aid is an antiblock agent containing about 50% of zeospheres in a linear low density polyethylene carrier.

3. An oriented multiple layer polymeric film structure according to claim 1 wherein the processing aid is a slip agent.

4. An oriented multiple layer polymeric film according to claim 1 wherein the processing aid is an antiblock agent containing 25% of silica quartz in a low density polyethylene.

5. An oriented multiple layer polymeric film structure according to claim 1 wherein the processing aids are present up to 3% of the total weight of the fourth layer.

6. An oriented multiple layer polymeric film structure according to claim 1 wherein the processing aids are present up to 4% of the total weight of the fourth layer.

7. A shrink bag made from the film of claim 1.

8. The film of claim 1 wherein said film is irradiated.

9. An oriented film comprising:
   (a) a first barrier layer wherein said barrier layer comprises a polyvinylidene chloride methyl acrylate blend and wherein said barrier layer has two opposing surfaces;
   (b) a second layer wherein said second layer comprises a blend of two ethylene vinyl acetate copolymers and wherein said second layer is adhered to one of said surfaces of said first barrier layer and wherein the two ethylene vinyl acetate copolymers which comprise the blend of the second layer each have a vinyl acetate content of at least 18% and different melt indexes;
   (c) a third layer wherein said third layer comprises a blend of two ethylene vinyl acetate copolymers and wherein said third layer is adhered to the other surface of said barrier layer and wherein the two ethylene vinyl acetate copolymers which comprise the blend of the third layer each have a vinyl acetate content of at least 18% and different melt indexes;
   (d) a fourth layer wherein said fourth layer comprises a blend of two ethylene vinyl acetate copolymers, a slip agent and an antiblock agent wherein said antiblock agent is selected from the group consisting of an antiblock agent having zeospheres in a linear low-density polyethylene carrier and an antiblock agent having silica quartz in a linear low-density polyethylene and wherein said fourth layer is adhered to said second layer and wherein the two ethylene vinyl acetate copolymers which comprise the blend of the fourth layer each have a vinyl acetate content of at least 18% and different melt indexes; and
   (e) a fifth layer wherein said fifth layer comprises a blend of linear low density polyethylene and low density polyethylene and wherein said fifth layer is adhered to said third layer;
wherein said second, third and fourth layers have the same ethylene vinyl acetate (EVA) copolymer blend melt index in each layer.

10. An oriented film according to claim 9 wherein the antiblock agent contains 50% of zeospheres in a linear low density polyethylene carrier.

11. An oriented film according to claim 9 wherein the antiblock agent contains 25% of silica quartz in a low density polyethylene.

12. An oriented multiply layer polymeric film structure according to claim 9 wherein the antiblock agent is present up to 3% of the total weight of the fourth layer.

13. An oriented film according to claim 9 wherein the antiblock agent is present up to 4% of the total weight of the fourth layer.

14. A shrink bag made from the film of claim 9.

15. An oriented film comprising:
   (a) a first barrier layer wherein said barrier layer comprises a polyvinylidene chloride methyl acrylate blend and wherein said barrier layer has two opposing surfaces;
   (b) a second layer adhered to one of said surfaces of said barrier layer wherein said second layer comprises a blend of two different ethylene vinyl acetate copolymers wherein one of the EVA is present at about 65%–85%, based on the total weight of the layer; the other EVA is present at about 15%–35%, based on the total weight of the layer and wherein the two ethylene vinyl acetate copolymers which comprise the blend of the second layer each have a vinyl acetate content of at least 18% and different melt indexes;

(c) a third layer adhered to the other surface of said barrier layer wherein said third layer comprises a blend of two different ethylene vinyl acetate copolymers wherein one of the EVA is present at about 65%–85%, based on the total weight of the layer; the other EVA is present at about 15%–35%, based on the total weight of the layer and wherein the two ethylene vinyl acetate copolymers which comprise the blend of the third layer each have a vinyl acetate content of at least 18% and different melt indexes;

(d) a fourth layer adhered to said second layer wherein the fourth layer comprises a blend of two different EVAs wherein one of the EVA is present at about 65%–85%, based on the total weight of the layer and the other EVA is present at about 15%–35%, based on the total weight of the layer and processing aids wherein said aids comprise a slip agent and antiblock agents and wherein said antiblock agent may be a blend of two or more antiblock agents and wherein said processing aids are present at about 0.1%–10%, based on the total weight of the layer and wherein the two ethylene vinyl acetate copolymers which comprise the blend of the fourth layer each have a vinyl acetate content of at least 18% and different melt indexes; and (e) a fifth layer adheres to the said third layer wherein the fifth layer comprises a blend of LLDPE wherein the LLDPE is present at about 80%–100% and LDPE is present at about 0%–20%, based on the total weight of the layer;

wherein said second, third and fourth layers have the same ethylene vinyl acetate (EVA) copolymer blend melt index in each layer.

16. The film of claim 15 wherein said film is irradiated.

* * * * *